C. T. RAY.
PLANTER.
APPLICATION FILED SEPT. 11, 1914.
1,213,411.
Patented Jan. 23, 1917.
2 SHEETS—SHEET 1.
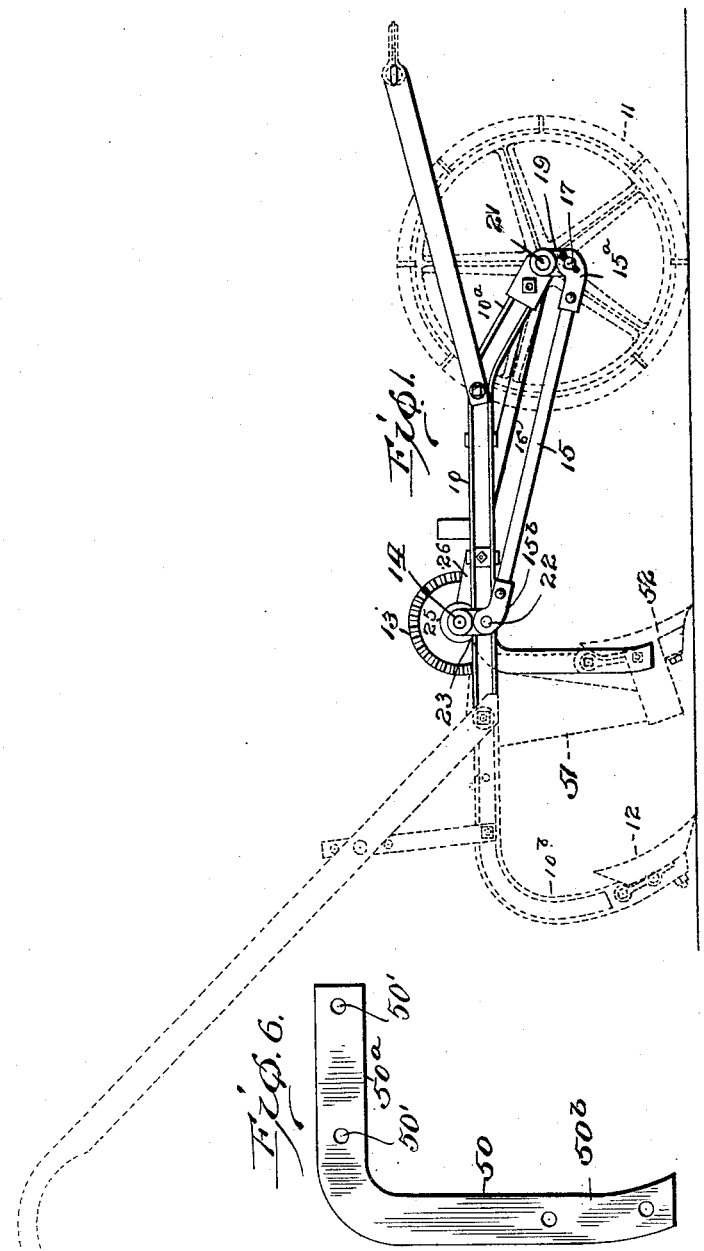
Witnesses
J. M. Fowler Jr.
L. N. Gillis
Inventor
C. T. Ray
By C. J. Stockman
Attorney

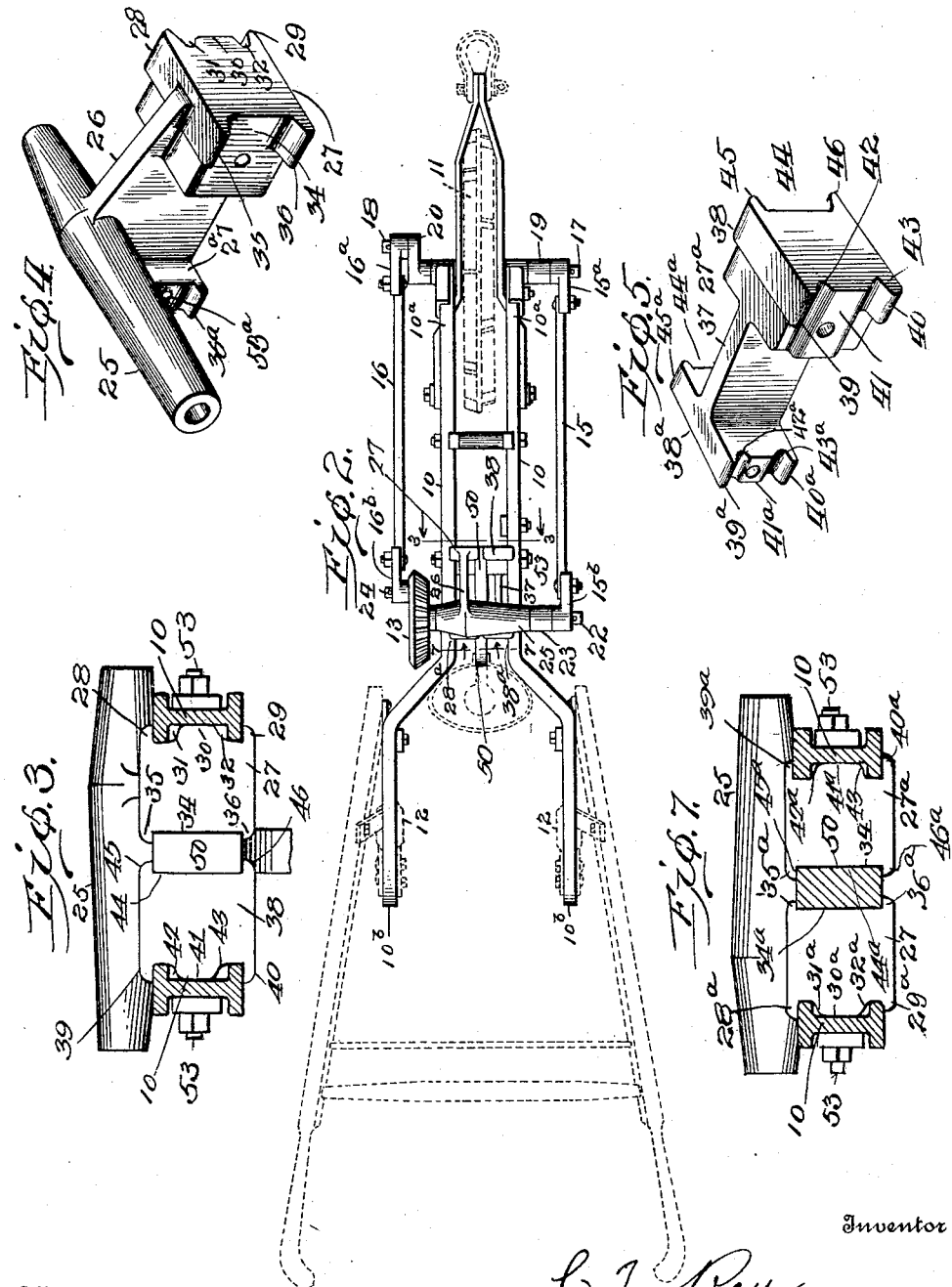
C. T. RAY.
PLANTER.
APPLICATION FILED SEPT. 11, 1914.
1,213,411.
Patented Jan. 23, 1917.
2 SHEETS—SHEET 2.

UNITED STATES PATENT OFFICE.

CHARLES T. RAY, OF LOUISVILLE, KENTUCKY, ASSIGNOR TO B. F. AVERY & SONS, OF LOUISVILLE, KENTUCKY, A CORPORATION OF KENTUCKY.

PLANTER.

1,213,411.          Specification of Letters Patent.     Patented Jan. 23, 1917.

Application filed September 11, 1914. Serial No. 861,176.

*To all whom it may concern:*

Be it known that I, CHARLES T. RAY, a citizen of the United States, residing at Louisville, in the county of Jefferson and State of Kentucky, have invented new and useful Improvements in Planters, of which the following is a specification.

This invention has relation to farm implements, and more particularly to walking planters, and its most important purpose is to provide a construction and correlation of parts for supporting the operating elements of the planter such as to possess maximum simplicity and strength. This object is carried out by the construction illustrated in the accompanying drawings showing the preferred embodiment of the invention.

In the drawings, wherein like characters of reference denote like parts in the several views: Figure 1 is a side elevation of a walking planter embodying my improvements, the seed hopper being removed and some of the non-essential parts shown in dotted outline. Fig. 2 is a plan view of the same. Fig. 3 is a cross section on the line 3—3 of Fig. 2, drawn to a larger scale. Figs. 4 and 5 are detail perspective views of complementary important parts of the implement which form a bearing for the driving shaft, support the standard and brace and stiffen the frame. Fig. 6 is a detail view of the standard. Fig. 7 is a cross section on the line 7—7 of Fig. 2, drawn to a larger scale.

I have herein exemplified the improvements constituting the present invention in a form of planter whose frame includes longitudinal side members 10, 10 which are bent downward at their forward ends 10ª 10ª having bearings for the supporting and driving wheel 11 and the downwardly bent rear ends 10ᵇ 10ᵇ being provided with covering shovels 12. It should be understood however that this particular construction of the side members 10, 10 is not essential and that the invention does not depend upon the use of coverers or of any particular kind or arrangement thereof. The inner sides of members 10 preferably have longitudinal channels for a purpose which will hereinafter be seen. In practice these members are preferably made of I-beams.

The seeding mechanism is driven by a beveled gear 13 which is fixedly secured to one end of a shaft 14 which extends transversely of the implement. The gear and shaft derive motion from the driving wheel 11, a double drive mechanism preferably being employed. This double drive mechanism comprises two pitmen 15 and 16 whose forward ends are provided with fittings 15ª and 16ª respectively engaged with wrist pins 17 and 18 projecting from cranks 19 and 20 fixedly secured to opposite sides of the shaft 21 of the driving wheel, and whose rear ends—that is, the rear ends of the pitmen 15 and 16 are provided with similar fittings 15ᵇ and 16ᵇ one of which (15ᵇ) engages a wrist pin 22 which projects from a crank 23 fixedly secured to one end of the shaft 14 while the fitting 16ᵇ engages a wrist pin 24 secured directly to the beveled gear 13.

It will be understood that in practice the seed dropping mechanism is carried by a hopper which is pivotally mounted on the frame of the machine so that it can be turned into and out of working position and that when it is in its working position it is driven by the beveled gear 13. I have considered it to be unnecessary to show the hopper or the seed mechanism in this application as they form no part of the invention. I prefer in practice, however, to employ a hopper and seed mechanism such as shown, for example, in Patent No. 1,171,885, dated Feb. 15, 1916.

Mounted between the gear 13 and the crank 23 and keeping the same in a spaced-apart relation, is a sleeve 25 which also forms a bearing for the shaft 14 of the gear 13. This sleeve is formed integral with a frame bracing and stiffening member having portions whose outer surfaces engage one of the longitudinal frame members 10 and whose inner surfaces engage the adjacent side of a standard 50 hereinafter referred to. It is preferred that this frame bracing and stiffening member be formed of a central web 26 arranged to extend longitudinally of the implement and that the portions thereof which are formed to engage the adjacent frame member 10 and the standard be in the form of blocks which are spaced apart and each of which extends laterally and in opposite directions from the central web 26. The forward block 27 has its forward end formed with upper and lower outwardly extending lips 28 and 29 arranged to extend over the upper and lower sides of the frame member 10, and between said lips the block is preferably provided with a projection 30 separated from the lips 28 and 29 by grooves or channels 31 and 32—the projection 30 being arranged to extend into the channel of the member 10 and the grooves or channels 30 and 31 being arranged to receive the flanges of said member. The rear block 27$^a$ has similar lips 28$^a$ and 29$^a$, grooves 31$^a$ and 32$^a$, and intermediate projection 30$^a$, on its outer side, as shown in Fig. 7. The inner side of the forward end of the block 27 is formed opposite the lips 28 and 29 with a longitudinal recess 34 which extends throughout the length thereof and receives the adjacent portion of the standard 50, which is disposed edgewise in said recess with its opposite sides presented to the wall of the latter and its upper and lower edges engaged by inwardly projecting lips 35 and 36 formed by the recess in the block. The rear block 27$^a$ has a similar recess 34$^a$ for the rear end of the standard, and lips 35$^a$ and 36$^a$ engage the upper and lower edges of said standard respectively.

A complementary frame bracing and stiffening member, shown in detail in Fig. 5, is employed. This member in all essential respects is substantially identical with the one shown in Fig. 4 except that it is not formed integral with the bearing sleeve. It comprises a central web 37 having blocks 38 and 38$^a$ at its opposite ends and said blocks having their outer edges formed with upper lips 39 and 39$^a$ and lower lips 40 and 40$^a$ and with intermediate projections 41 and 41$^a$ and upper and lower grooves or channels 42, 43 and 42$^a$, 43$^a$ so as to receive the outer edges of the upper and lower flanges of the adjacent member 10 and extend into the channel of said member and engage the side thereof. The inner sides of the blocks 38 and 38$^a$ are formed with recesses 44 and 44$^a$, respectively, for the adjacent sides of the standard 50, the lips 45 and 46, and 45$^a$ and 46$^a$, engaging the upper and lower edges of said standard. The standard 50 hereinbefore referred to is of approximately inverted L-shape, its upper forwardly extending member 50$^a$ being received and engaged at different places along its length by the blocks hereinbefore referred to and its depending approximately vertical portion 50$^b$ being arranged, in practice, preferably, to carry a seed hopper 51 and an opener 52. The opener 52 herein indicated is of shovel construction but it will be understood that this is not essential.

The blocks and the standard are secured to each other and to the side members 10, 10 of the frame by through-bolts, which respectively extend through the forward and rear blocks and also through the openings 50', 50' in the forwardly extending part of the standard. It will be noted that the standard, by the means set forth, is rigidly held against movement relatively to the bracing and stiffening means and to the frame. The forward bolt is marked 53. The rear bolt is not shown but the openings therefor are indicated at 53$^a$ in Figs. 4 and 5.

From the foregoing it will be noted that the frame is strongly braced and the parts which carry the driving gear of the seed dropping mechanism and the seed chute are firmly supported by means which are of simple and easily assembled construction and arrangement.

Having now described the invention what I believe to be new and desire to secure by Letters Patent, is:—

1. In combination, a frame having spaced longitudinal members, bracing and stiffening means arranged between said members and engaging the same, said bracing and stiffening means including a pair of blocks whose confronting surfaces are provided with flanges which extend toward each other and are arranged at the top and bottom of the blocks, a standard having a forwardly projecting portion arranged edgewise with its sides presented toward the inner side walls of the blocks, respectively, and its upper and lower edges adjacent to the flanges of the blocks, and a fastening means which extends through the frame members, blocks and standards and secures the parts together.

2. In combination, a frame having spaced longitudinal members, a standard having a forwardly projecting portion arranged between said members, and means for bracing the frame members and securing the standard rigidly against movement relatively to the frame, said means comprising members which are disposed on opposite sides of the standard and between the same and the frame members and have their inner, confronting, sides provided at the top and bottom thereof with flanges which respectively overlie and underlie the standard, and a plurality of spaced fastening elements which extend through the standard, bracing members and frame-members.

3. In combination, a frame having spaced longitudinal members, bracing and stiffening means, comprising a pair of complementary members arranged between the frame members and each having at each end a block which projects laterally in opposite directions from the intermediate part of the member, said blocks having their inner, confronting, surfaces provided at the top and bottom thereof with lateral flanges, a standard having a forwardly projecting portion arranged edgewise, with its sides presented toward the inner side walls of the blocks and its upper and lower edges respectively underlying and overlying the upper and lower flanges of the blocks, and fastening means for securing the frame members, blocks and standard together, said fastening means having elements which extend through the frame members, blocks and standard.

4. In combination, a frame having spaced longitudinal members, bracing and stiffening means, comprising a pair of complementary members arranged between the frame members and each comprising a plurality of blocks and a web intermediate the blocks, each block extending in opposite directions beyond the sides of the web, the inwardly projecting portions having flanges at the top and bottom thereof, the flanges of one block of each member extending throughout a portion only of the length of the block, a standard having a forwardly projecting portion arranged edgewise, with its sides presented toward the inner side walls of the blocks throughout the length of the latter and its upper and lower edges respectively underlying and overlying the upper and lower flanges of the blocks, and fastening means for securing the frame members, blocks and standard together, said fastening means being spaced along the standard and extending through the same.

5. In combination, longitudinal frame members having inwardly extending flanges, a standard having a portion arranged longitudinally between said frame members, bracing and stiffening members arranged on opposite sides of said portion of the standard and between the same and the longitudinal members, each bracing and stiffening member having its outer surface formed with spaced grooves or channels which receive the flanges of the longitudinal members and also having portions between said grooves or channels, the latter portions being received by the spaces between the flanges of the longitudinal members, and means for securing the longitudinal frame members, standard and bracing and stiffening members together.

6. In combination, longitudinal frame members having inwardly extending flanges, a standard having a portion arranged between said frame members, bracing and stiffening members arranged between the standard and the longitudinal frame members, each bracing and stiffening member having inwardly and outwardly extending portions at its opposite ends, the inwardly extending portions having lips which engage the upper and lower edges of the standard and the outwardly extending portions having spaced grooves or channels which receive the flanges of the longitudinal frame members and parts intermediate the grooves or channels which extend into the spaces between the said flanges, and means for securing the longitudinal members, bracing and stiffening members and standard together.

7. In combination, longitudinal frame members, a standard having a portion arranged between said frame members, a transversely arranged sleeve, bracing and stiffening means arranged between the standard and the longitudinal members, said bracing and stiffening means comprising complementary members one of which is integral with the sleeve and is arranged between the standard and one of the longitudinal frame members and the other of which members is separate from the sleeve and is arranged between the standard and the other longitudinal frame member, and means for securing the longitudinal frame members, standard and bracing and stiffening members to each other.

8. In combination, longitudinal frame members, a standard having a portion arranged between said frame members, a transversely arranged sleeve, bracing and stiffening means arranged between the standard and longitudinal members, said bracing and stiffening means comprising complementary members one of which is integral with the sleeve and is arranged between the standard and one of the longitudinal frame members and has its inner and outer sides provided with lips to engage the upper and lower surfaces of the standard and said frame member, and the other of which members is separate from the sleeve and is arranged between the standard and the other longitudinal frame member and has its outer and inner sides formed with lips to engage the upper and lower sides of said standard and frame member, and means for securing the longitudinal frame member, standard and bracing and stiffening members to each other.

9. In combination, longitudinal frame members having inwardly extending flanges, a standard having a portion arranged between said frame members, a transversely arranged sleeve, bracing and stiffening means arranged between the standard and the longitudinal members, said bracing and stiffening means comprising complementary members each of which is provided at its front and rear ends with inwardly and outwardly extending projections, the inner sides of said projections having recesses which receive the sides of the standard and the outer sides of said projections having channels which receive the flanges of the longitudinal frame members and also having portions which project into the space between said flanges of the longitudinal frame members and means for securing the longitudinal frame members, standard and bracing and stiffening members to each other.

10. In combination, longitudinal frame members, a standard having a portion arranged between said frame members, the standard also having a depending portion, a seed chute connected to the depending portion of the standard, a gear having a shaft, a driving wheel, a driving connection between the driving wheel and shaft and another driving connection between the driving wheel and gear, a transversely extending sleeve forming a bearing for the shaft, bracing and stiffening means, comprising complementary members one of which is integral with the sleeve and is arranged between the standard and one of the longitudinal frame members and the other of which is separate from the sleeve and is arranged between the standard and the other longitudinal frame member, and means for securing the longitudinal frame members, standard and bracing and stiffening members together.

11. In combination, longitudinal frame members having flanges, a standard having a portion arranged between said frame members, the standard also having a depending portion, a seed chute connected to the depending portion of the standard, a gear having a shaft, a driving wheel, a driving connection between the driving wheel and shaft and another driving connection between the driving wheel and gear, a transversely extending sleeve forming a bearing for the shaft, bracing and stiffening means comprising complementary members one of which is integral with the sleeve and has inwardly and outwardly extending portions at its opposite ends, the inwardly extending portions having recesses which receive one side of the standard and the outwardly extending portion having grooves which receive the flanges of one longitudinal frame member, and the other of which complementary members is separate from the sleeve and has inwardly and outwardly extending portions at its opposite ends, respectively formed to receive the other side of the standard and the flanges of the other longitudinal frame member, and means for securing the longitudinal frame members, standard and bracing and stiffening members together.

In testimony whereof I have hereunto set my hand in presence of two subscribing witnesses.

CHARLES T. RAY.

Witnesses:
WM. M. JOHNSTON,
J. FRED HARTKEMEIER, Jr.

Copies of this patent may be obtained for five cents each, by addressing the "Commissioner of Patents, Washington, D. C."